United States Patent
Wang et al.

(10) Patent No.: US 11,586,988 B2
(45) Date of Patent: Feb. 21, 2023

(54) METHOD OF KNOWLEDGE TRANSFERRING, INFORMATION PROCESSING APPARATUS AND STORAGE MEDIUM

(71) Applicant: FUJITSU LIMITED, Kawasaki (JP)

(72) Inventors: Mengjiao Wang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 924 days.

(21) Appl. No.: 16/438,664

(22) Filed: Jun. 12, 2019

(65) Prior Publication Data

US 2019/0385086 A1 Dec. 19, 2019

(30) Foreign Application Priority Data

Jun. 13, 2018 (CN) .......................... 201810607041.5

(51) Int. Cl.
*G06N 20/20* (2019.01)
*G06K 9/62* (2022.01)

(52) U.S. Cl.
CPC ............ *G06N 20/20* (2019.01); *G06K 9/6215* (2013.01); *G06K 9/6232* (2013.01)

(58) Field of Classification Search
CPC ...... G06N 20/20; G06N 3/084; G06N 3/0454; G06N 3/08; G06K 9/6215; G06K 9/6232
See application file for complete search history.

(56) References Cited

U.S. PATENT DOCUMENTS

| | | | | |
|---|---|---|---|---|
| 10,762,891 | B2 * | 9/2020 | Kaskari | G10L 15/063 |
| 10,885,900 | B2 * | 1/2021 | Li | G10L 25/30 |
| 10,963,748 | B1 * | 3/2021 | Tulyakov | G06N 3/0472 |
| 10,970,598 | B1 * | 4/2021 | Ryu | G06K 9/6232 |
| 11,113,518 | B2 * | 9/2021 | Chua | G06V 30/414 |
| 11,195,093 | B2 * | 12/2021 | Kim | G06N 7/005 |
| 11,210,589 | B2 * | 12/2021 | Baker | G06K 9/6264 |
| 11,334,763 | B2 * | 5/2022 | Wei | G06K 9/6263 |
| 11,341,398 | B2 * | 5/2022 | Toba | G06N 3/0454 |

(Continued)

OTHER PUBLICATIONS

Fan et al, Learning to Teach, Published as a conference paper at ICLR 2018 (Year: 2018).*

(Continued)

*Primary Examiner* — Andrae S Allison
(74) *Attorney, Agent, or Firm* — Staas & Halsey LLP

(57) ABSTRACT

There are provided a method of knowledge transferring, an information processing apparatus and a storage medium. The method of knowledge transferring includes: obtaining a first model which has been trained in advance with respect to a predetermined task; and training a second model with respect to the predetermined task by utilizing a comprehensive loss function, such that the second model has knowledge of the first model. The comprehensive loss function is based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task.

20 Claims, 2 Drawing Sheets

(56) References Cited

U.S. PATENT DOCUMENTS

| | | | |
|---|---|---|---|
| 2017/0083829 A1 | 3/2017 | Kang et al. | |
| 2021/0319258 A1* | 10/2021 | Shen | G06N 3/0454 |
| 2022/0237513 A1* | 7/2022 | He | G06N 7/005 |

OTHER PUBLICATIONS

B. Barz and J. Denzler, "Deep Learning on Small Datasets without Pre-Training using Cosine Loss," 2020 IEEE Winter Conference on Applications of Computer Vision (WACV), 2020, pp. 1360-1369, doi: 10.1109/WACV45572.2020.9093286. (Year: 2020).*

Peng et al., Correlation Congruence for Knowledge Distillation, https://arxiv.org/pdf/1904.01802.pdf, Apr. 3, 2019 (Year: 2019).*

Extended European Search Report dated Nov. 12, 2019 in European Patent Application No. 19177917.2.

Yong Kiam Tan et al: "Improved Recurrent Neural Networks for Session-based Recommendations", Deep Learning for Recommender Systems, ACM, Sep. 15, 2016, pp. 17-22, XP058280440, DOI: 10.1145/2988450.2988452, ISBN: 978-1-4503-4795-2.

* cited by examiner

METHOD OF KNOWLEDGE TRANSFERRING, INFORMATION PROCESSING APPARATUS AND STORAGE MEDIUM

CROSS-REFERENCE TO RELATED APPLICATIONS

This application claims the priority benefit of Chinese Patent Application No. 201810607041.5, filed on Jun. 13, 2018 in the China National Intellectual Property Administration, the disclosure of which is incorporated herein in its entirety by reference.

FIELD

The present disclosure generally relates to the field of machine learning, and in particular, to a method of knowledge transferring, a storage medium having stored thereon instruction code capable of causing a machine to implement the method of knowledge transferring, and an information processing apparatus capable of using a model which is obtained by the method of knowledge transferring.

BACKGROUND

Knowledge transferring is used for training a network model called as a "student" model using a supervisory signal of a network model called as a "teacher" model. In knowledge transferring, knowledge of the "teacher" model is transferred to the "student" model by causing the "student" model to output the same result as the "teacher" model, and thus the "student" model acquires the expression capacity of the "teacher" model.

As an example, the "teacher" model may be a large neural network model, and the "student" model obtained after the knowledge transferring may be a small neural network model. Further, the "teacher" model and the "student" model may be network models for processing different data. For example, the "teacher" model may process face image data, and the "student" model obtained after the knowledge transferring may process fingerprint image data. Different objects may be achieved by the knowledge transferring in different conditions. For example, a processing speed of a network model can be increased, and an existing model can be used for a new task.

With the development of machine learning, it is desired to provide an effective method of knowledge transferring.

SUMMARY

Brief summary of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

In view of a demand for improving the conventional method of knowledge transferring, an object of the present disclosure is to provide a method of knowledge transferring, a storage medium having stored thereon instruction code capable of causing a machine to implement the method of knowledge transferring, and an information processing apparatus using a model obtained by the method of knowledge transferring, which achieve the knowledge transferring more effectively.

In an embodiment of the present disclosure, a method of knowledge transferring is provided. The method of knowledge transferring includes: obtaining a first model which has been trained in advance with respect to a predetermined task; and training a second model with respect to the predetermined task by utilizing a comprehensive loss function, such that the second model has knowledge of the first model. The comprehensive loss function is based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task.

In an embodiment of the present disclosure, a knowledge transferring device is provided. The knowledge transferring device includes a first unit and a second unit. The first unit is configured to obtain a first model which has been trained in advance with respect to a predetermined task. The second unit is configured to train a second model with respect to the predetermined task by utilizing a comprehensive loss function, such that the second model has knowledge of the first model. The comprehensive loss function is based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task.

In another embodiment of the present disclosure, an information processing apparatus is further provided. The information processing apparatus includes a processor. The processor is configured to: input data for process into the second model which is obtained by the method of knowledge transferring described above, and obtain a processing result of the second model for the data for process.

In yet another embodiment of the present disclosure, there is further provided a program causing a computer to implement the method of knowledge transferring described above.

In still another embodiment of the present disclosure, a corresponding storage medium is further provided. The storage medium has stored thereon machine readable instruction code. The instruction code, when read and executed by a machine, is capable of causing the machine to implement a method of knowledge transferring. The instruction code includes an instruction code portion for: obtaining a first model which has been trained in advance with respect to a predetermined task; and training a second model with respect to the predetermined task by utilizing a comprehensive loss function, such that the second model has knowledge of the first model. The comprehensive loss function is based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task.

With the above embodiments of the present disclosure, at least the following beneficial effects can be achieved. With the method of knowledge transferring, the knowledge transferring device, the information processing apparatus and the storage medium provided in the present disclosure, it is advantageous in avoiding transferring incorrect knowledge of a "teacher" model to a "student" model, such that the knowledge transferring can be achieved effectively and accurately.

The above and other advantages of the present disclosure are apparent from the following detailed description of preferred embodiments of the present disclosure in conjunction with the drawings.

BRIEF DESCRIPTION OF THE DRAWINGS

The present disclosure can be understood better with reference to the description given in conjunction with the drawings in the following. The same or similar element is indicated by the same or similar reference numeral throughout all the drawings. The drawings are included in the specification together with the following detailed description and form a part of the specification, and are used to further illustrate preferred embodiments of the present disclosure and explain principles and advantages of the present disclosure by examples. In the drawings.

DETAILED DESCRIPTION

Figure 1:
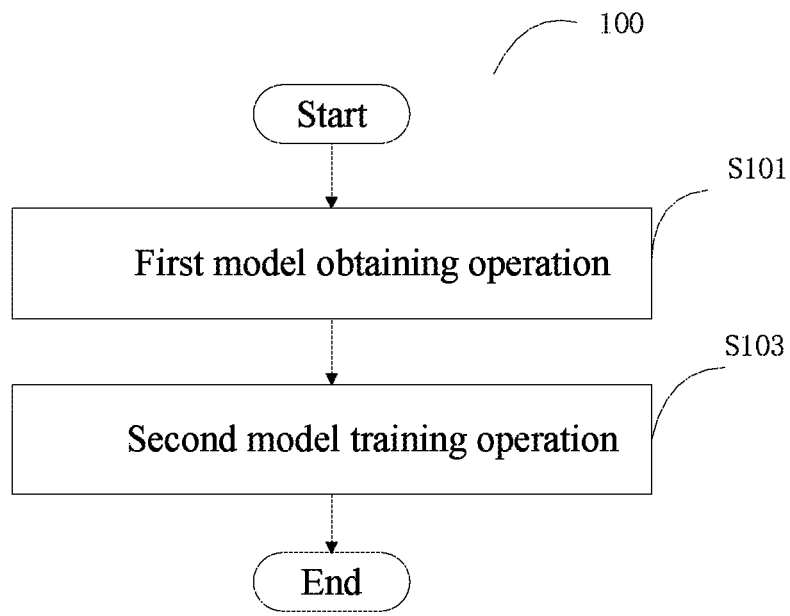
FIG. 1 is a schematic flowchart of a method of knowledge transferring according to an embodiment of the present disclosure.

Exemplary embodiments of the present disclosure are described hereinafter in conjunction with the drawings. For the sake of clarity and conciseness, not all the features of practical implementations are described in the specification. However, it should be understood that numerous implementation-specific decisions shall be made during developing any of such practical implementations so as to achieve the developer's specific goals, for example, to conform to constraints related to system and service, with these constraints varying with different implementations. In addition, it should further be understood that although the developing work may be very complicated and time-consuming, the developing work is only a routine task for those skilled in the art benefiting from the present disclosure.

It should further be noted that only those apparatus structures and/or processing steps closely relevant to the solutions of the present disclosure are illustrated in the drawings while other details less relevant to the present disclosure are omitted so as not to obscure the present disclosure due to those unnecessary details.

In an embodiment of the present disclosure, a method of knowledge transferring is provided. FIG. 1 is a schematic flowchart of a method 100 of knowledge transferring according to an embodiment of the present disclosure.

As shown in FIG. 1, the method 100 of knowledge transferring may include: a first model obtaining operation S101 of obtaining a first model which has been trained in advance with respect to a predetermined task; and a second model training operation S103 of training a second model with respect to the predetermined task by utilizing a comprehensive loss function, such that the second model has knowledge of the first model. The comprehensive loss function used in the second model training operation S103 may be based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task. For example, the second loss function may represent a difference between the output result of the second model for the training sample in regard to the predetermined task and a correct result (i.e. the ground truth).

In the method of knowledge transferring in this embodiment, the first loss function related to the knowledge transferring that represents a difference between the first model and the second model is weighted by the accuracy of the output result of the first model for the training sample in regard to the predetermined task, said accuracy also being referred to herein as a confidence of the first model for the training sample. That is, the first loss function is weighted by the confidence of the first model as a "teacher" model for the training sample. Therefore, compared with the conventional technology in which the knowledge of the "teacher" model is transferred to a "student" model regardless of the confidence of the "teacher" model for the training sample, the present invention is advantageous in avoiding transferring incorrect knowledge of the "teacher" model to the "student" model, such that the knowledge transferring can be achieved more effectively and accurately.

In a preferred embodiment, as the accuracy of the output result of the first model for the training sample in regard to the predetermined task is higher, a weight of the first loss function is greater. In this case, the first loss function related to the knowledge transferring may play a greater role in the comprehensive loss function, indicating that the first model as the "teacher" model may lead the entire training process, such that "correct" knowledge of the first model can be transferred to the second model. In contrast, as the accuracy of the output result of the first model for the training sample in regard to the predetermined task is lower, the weight of the first loss function is smaller. In this case, the second loss function related to the accuracy of the second model may play a greater role in the comprehensive loss function, indicating that the second model as the "student" model may lead the entire training process, such that processing capacity of the second model can be improved. In the above weighting manner, when the accuracy of the "teacher" model for a certain training sample is quite low, the first loss function related to the knowledge transferring may play almost no role in the comprehensive loss function, thereby avoiding transferring incorrect knowledge of the "teacher" model to the "student" model.

In a training process of the second model training operation S103, the second model may be iteratively trained, for example, with an object that the comprehensive loss function meets a desired condition (for example, reaching a minimum value). The training process may end when the comprehensive loss function reaches the minimum value, when the value of the comprehensive loss function no longer changes, when a predetermined number of iterations are performed, or when other iteration end conditions are met, thereby obtaining the second model to which the knowledge is effectively transferred. Those skilled in the art should understand that, the second model may be trained, based on the constructed comprehensive loss function, by any existing method such as a gradient descent method, to obtain optimal parameters of the second model, which are not described in detail herein.

As an example, each of the first model and the second model may be a neural network model, such as a convolutional neural network (CNN) model. For example, the first model may be a neural network model having a complex structure and a number of parameters, and the second model may be a neural network model smaller than the first model, for example, including fewer layers and fewer parameters than the first model. In this case, the processing speed of the second model obtained after the knowledge transferring can be faster than that of the first model, and the second model is more suitable than the first model for an application in a mobile device or an embedded device that has limited processing resources.

As an example, the training sample may include one of an image sample, a speech sample, or a document sample. For example, the training sample may include a face image sample, for example, including front face images or side face images of different humans, or face images at different postures of different persons. Further, the training sample may also include a fingerprint image sample.

As an example, the predetermined task may include a classification task. For example, the predetermined task may be a task of classifying the face images into categories or classes that correspond to different postures or different persons, such as a face recognition task.

As described above, the first loss function represents the difference between processing results of the second model and the first model for the training sample. The "processing result" herein may include, for example, a final output result of the first model or the second model for the training sample in regard to the predetermined task, such as a classification result of the classification task. The classification result may be indicated by probabilities of the training sample belonging to respective classes. Further, the "processing result" may also include a feature extracted from the training sample by the first model or the second model. For example, in the case that each of the first model and the second model is a neural network model, the processing result may include output data of a certain layer of the neural network model after the training sample is inputted into the neural network model.

It should be noted that though the following description is given by taking a neural network model performing the classification task on image data as an example of each of the first model and the second model, those skilled in the art should understand that the present disclosure is not limited thereto. The present disclosure may be appropriately applied to a first model and a second model having any structure for any task, as long as the first model and the second model are applicable to the flowchart shown in FIG. 1.

In an embodiment, the first loss function related to the knowledge transferring may include a first sub-loss function. The first sub-loss function represents a difference between a predetermined feature extracted from the training sample by the second model and a predetermined feature extracted from the training sample by the first model.

The first sub-loss function representing the feature difference is particularly useful when the second model is obtained to be used as a feature extractor. When the first loss function is constructed based on such a sub-loss function and then used in the comprehensive loss function, the second model obtained after the knowledge transferring acquires a capacity of the first model to characterize (features of) data. Therefore, the obtained second model may be used in feature extraction, similar to the first model.

The present inventors find that the first sub-loss function constructed for the knowledge transferring process may be reasonably set according to demands of subsequent applications. Therefore, in a preferred embodiment, the first sub-loss function may be based on a cosine distance between the predetermined feature extracted from the training sample by the second model and the (corresponding) predetermined feature extracted from the training sample by the first model. The cosine distance is defined based on a cosine similarity and is used to evaluate a difference between vectors. The cosine similarity is defined as a cosine value of an angle between two vectors in an inner product space. A sum of the cosine distance and the cosine similarity is equal to one. That is, a value of the cosine distance is obtained by subtracting a value of the cosine similarity from one.

In this preferred embodiment, the second model obtained after the knowledge transferring is be used in tasks of recognition processing or calculating similarity (for example, a task of comparing whether a sample to be recognized/processed matches a registered/target sample), such as face recognition, speaker recognition, and fingerprint recognition. In the tasks, a cosine similarity between features is generally utilized to evaluate a similarity between data for process (the sample to be recognized) and target data (the registered sample). With the first sub-loss function constructed based on the cosine distance between the features of the first model and the second model, the second model can acquire a feature extraction capability similar to that of the first model in calculating the cosine similarity, thus improving the accuracy of the recognition processing, when compared with the conventional technology that usually utilizes a loss function based on a Euclidean distance to perform the knowledge transferring.

Figure 2A:
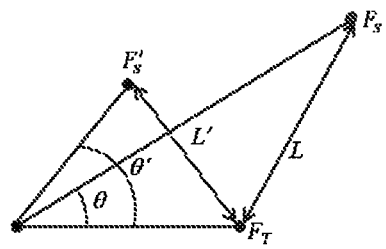
FIGS. 2A and 2B are schematic diagrams showing a difference between a loss function based on a Euclidean distance and a loss function based on a cosine distance.
Figure 2B:
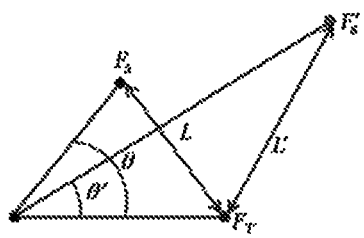

Performances associated with a loss function based on the Euclidean distance and a loss function based on the cosine distance are compared with reference to FIGS. 2A and 2B, which are schematic diagrams showing a difference between a loss function based on a Euclidean distance and a loss function based on a cosine distance. In FIGS. 2A and 2B, $F_T$ represents a feature extracted from a given training sample by a first model (i.e., representing a location of said feature in a feature space), and $F_S$ represents a feature extracted from the given training sample by a second model before being optimized. F's in FIG. 2A represents a feature extracted from the given training sample by the second model after being optimized utilizing a loss function based on the Euclidean distance. F's in FIG. 2B represents a feature extracted from the given training sample by the second model after being optimized utilizing a loss function (for example, the loss function including the first sub-loss function constructed based on the cosine distance as described above) based on the cosine distance. The second model is optimized, for example, with an object that the loss function based on the Euclidean distance or the cosine distance reaches a minimum value.

It can be seen from FIG. 2A that, after the second model is optimized utilizing the loss function based on the Euclidean distance, a Euclidean distance between the feature F's extracted from the given training sample by the second model and the feature FT extracted from the given training sample by the first model is reduced from L to L', while an angle between the feature F's and the feature FT is increased from θ to θ'. That is, a cosine similarity cos θ between the feature F's and the feature FT is reduced.

In contrast, as shown in FIG. 2B, after the second model is optimized utilizing the loss function based on the cosine distance, though a Euclidean distance between the feature F's extracted from the given training sample by the second model and the feature FT extracted from the given training sample by the first model is increased from L to L', an angle between the feature F's and the feature FT is reduced from θ to θ'. That is, a cosine similarity cos θ between the feature F's and the feature FT is increased. In other words, with the loss function based on the cosine distance, the cosine similarity between the feature F's extracted by the optimized second model and the feature FT extracted by the first model is made as large as possible. Therefore, in this preferred embodiment, the first sub-loss function, which is based on the cosine distance between the predetermined feature extracted from the training sample by the second model and the predetermined feature extracted from the training sample by the first model, is particularly useful for recognition tasks that utilize the cosine similarity as a similarity.

Further, although FIG. 2B shows a case in which the cosine similarity between the feature F's extracted by the optimized second model and the feature FT extracted by the first model is increased while the Euclidean distance between the feature F's and the feature FT is increased, this is only an example. In practical applications, there may also exist a case in which the cosine similarity between the feature F's and the feature FT is increased while the Euclidean distance between the feature F's and the feature FT is decreased or substantially unchanged. In this preferred embodiment, it is only required that the cosine similarity is increased, while the change of the Euclidean distance does not matter, which is not described in detail herein.

In a preferred embodiment, in addition to the first sub-loss function based on the cosine distance, the first loss function may further (optionally) include a second sub-loss function. The second sub-loss function represents a difference between output results of the second model and the first model for the training sample in regard to the predetermined task.

For instance, an example is described as follows. It is assumed that each of the first model and the second model is a neural network model implementing the classification task, and a label of a category c is indicated by 1, 2, . . . , C, where C is a natural number and represents a total number of categories in the classification task. An input training sample is indicated by $\{x_i, 1, 1, 2, \ldots m\}$, where m is a natural number and represents a total number of training samples. In this case, a first loss function $L_1$ may be expressed as follows:

$$L_1 = \Sigma_{i=1}^{m} A_i (L_{sub1i} + L_{sub2i}) \quad (1)$$

where $A_i$ denotes accuracy of a classification result (or a confidence) of the first model for a training sample $X_i$, $L_{sub1i}$ denotes a first sub-loss function representing a difference between a predetermined feature extracted from the training sample $X_i$ by the second model and a (corresponding) predetermined feature extracted from the training sample $X_i$ by the first model, and $L_{sub2i}$ denotes a second sub-loss function representing a difference between a classification result of the second model for the training sample $X_i$ and the classification result of the first model for the training sample $X_i$.

As an example, the confidence $A_i$ of the first model for the training sample $X_i$ may be expressed as follows:

$$A_i = (1 - w_i) \quad (2)$$

$$w_i = \frac{1}{2} \sum_{c=1}^{C} \|y_i^t(c) - x_i^t(c)\| \quad (3)$$

where $y_i^t(c)$ denotes a probability that the training sample $X_i$ actually belongs to the category c, $x_i^t(c)$ denotes a probability that the training sample $X_i$ is classified into the category c by the first model, and ½ is a coefficient for normalizing a value of $W_i$ in a range of 0 to 1. When the value of $W_i$ is 0, it is indicated that the training sample $X_i$ is correctly classified by the first model, and in this case, the accuracy $A_i$ reaches a maximum value.

As described above, the first sub-loss function may be based on the cosine distance between the predetermined features. For example, the first sub-loss function $L_{sub1i}$ may be based on a cosine distance $L_{Fi}$ as expressed in the following formula (4):

$$L_{Fi} = 1 - \cos(f_{x_i}^s, f_{x_i}^t) = 1 - \frac{(f_{x_i}^s, f_{x_i}^t)}{\|f_{x_i}^s\|\|f_{x_i}^t\|} \quad (4)$$

$$L_{sub1i} = \lambda_F L_{Fi}$$

where $f_{x_i}^t$ denotes a predetermined feature extracted from the training sample $X_i$ by the first model, and $f_{x_i}^s$ denotes a predetermined feature extracted from the training sample $X_i$ by the second model. Further, $\lambda_F$ is a coefficient set for the cosine distance $L_{Fi}$ to balance influences of different loss (sub-loss) functions, which may be reasonably set according to experiments or application demands.

As an example, after the training sample $X_i$ is input into the first model which is a neural network model, output data of a layer of the model is extracted as the predetermined feature (a feature vector) $f_{x_i}^t$. Similarly, the predetermined feature (a feature vector) $f_{x_i}^s$ may be extracted by the second model. The layer described above may be a layer other than an input layer or an output layer of the neural network model, for example, one of a plurality of hidden layers of the neural network model.

Alternatively, in another example, the first sub-loss function may be based on a Euclidean distance between the predetermined feature $f_{x_i}^t$ extracted from the training sample $X_i$ by the second model and the predetermined feature $f_{x_i}^s$ extracted from the training sample $X_i$ by the first model. For example, the first sub-loss function $L_{sub1i}$ may be based on a Euclidean distance $L_{Ei}$ as expressed in the following formula (5):

$$L_{Ei} = \|f_{x_i}^s - f_{x_i}^t\|$$

$$L_{sub1i} = \lambda_E L_{Ei} \quad (5)$$

Similar to $\lambda_F$ in the formula (4), $\lambda_E$ in the formula (5) is a coefficient set for the Euclidean distance to balance influences of different loss (sub-loss) functions, which may be reasonably set according to the experiments or the application demands.

Further, the second sub-loss function $L_{sub2i}$ may represent the difference between the classification results of the second model and the first model for the training sample $X_i$. For example, the second sub-loss function $L_{sub2i}$ may be in the form of a cross entropy, such as a KL divergence $L_{Li}$ that may be calculated as follows.

$$L_{Li} = \sum_{c=1}^{C} x_i^t(c) \log \frac{x_i^t(c)}{x_i^s(c)} \tag{6}$$

where $x_i^t(c)$ denotes a probability that the training sample $X_i$ is classified into the category c by the first model, and $x_{x_i}^s(c)$ denotes a probability that the training sample $X_i$ is classified into the category c by the second model.

In summary, when the first sub-loss function $L_{sub1i}$ is based on the cosine distance $L_{Fi}$ expressed in the formula (4), the first loss function may be expressed as follows:

$$L_1 = \Sigma_{i=1}^{m}(1-w_i)(\lambda_F L_{Fi} + \lambda_L L_{Li}) \tag{7}$$

Alternatively, when the first sub-loss function $L_{sub1i}$ is based on the Euclidean distance $L_{Ei}$ expressed in the formula (5), the first loss function may be expressed as follows:

$$L_1' = \Sigma_{i=1}^{m}(1-w_i)(\lambda_E L_{Ei} + \lambda_L L_{Li}) \tag{8}$$

It should be noted that although the case of the first loss function including both the first sub-loss function and the second sub-loss function is described herein, those skilled in the art should understand that the first loss function in this embodiment may include only the first sub-loss function. For example, the first loss function may be expressed as an expression in which an item of $\lambda_L L_{Li}$ in the formula (7) or the formula (8) is removed.

Further, as an example, in this preferred embodiment, a second loss function $L_2$ may be based on a cross entropy representing a difference between the classification result of the second model for the training sample $X_i$ and a correct result, such as a Softmax loss function $L_{si}$:

$$L_{Si} = \sum_{c=1}^{C} y_{ic} \log s_{ic} \tag{9}$$

where $S_{ic}$ denotes, for example, a c-th value of an output vector $S_i$ in a Softmax layer following a full connection layer in a neural network model as the second model, and it represents a probability that the training sample $X_i$ belongs to the category c; and $y_{ic}$ denotes a label of the sample. A value of $y_{ic}$ is equal to one only when an actual category (i.e. a ground-truth category) of the sample $x_i$ is the category c, otherwise the value of $y_{ic}$ is equal to zero.

Based on the Softmax loss function $L_{si}$, the second loss function $L_2$ may be constructed as follows:

$$L_2 = \lambda_S \Sigma_{i=1}^{m} L_{si} \tag{10}$$

Similar to $\lambda_F$ in the formula (4) and $\lambda_E$ in the formula (5), $\lambda_S$ in the formula (10) is a coefficient set for the Softmax loss function to balance influence of different loss functions, which may be reasonably set according to the experiments or the application demands.

Alternatively, a second loss function $L_2'$ weighted by the accuracy $A_i$ of the classification result of the first model for the training sample $X_i$ may be constructed in a manner similar to but "complementary to" that of the first loss function.

$$L_2' = \lambda_S \Sigma_{i=1}^{m}(1-A_i)L_{Si} = \lambda_S \Sigma_{i=1}^{m} w_i L_{Si} \tag{11}$$

Based on the formula (7) (in which the first sub-loss function included in the first loss function is based on the cosine distance) and the formula (10) (in which the second loss function is not weighted), a comprehensive loss function in this preferred embodiment may be obtained as below.

$$L_{overall} = L_1 + L_2 = \Sigma_{i=1}^{m}(1-w_i)(\lambda_L L_{Li} + \lambda_F L_{Fi}) + \lambda_S \Sigma_{i=1}^{m} L_{Si}$$

$$L_{overall} = \Sigma_{i=1}^{m}((1-w_i)(\lambda_L L_{Li} + \lambda_F L_{Fi}) + \lambda_S L_{Si}) \tag{12}$$

Alternatively, based on the formula (7) (in which the first sub-loss function included in the first loss function is based on the cosine distance) and the formula (11) (in which the second loss function is weighted), an comprehensive loss function in another form in this preferred embodiment may be obtained as below.

$$L_{overall}' = L_1 + L_2' = \Sigma_{i=1}^{m}(1-w_i)(\lambda_L L_{Li} + \lambda_F L_{Fi}) + \lambda_S \Sigma_{i=1}^{m} L_{Si}$$

$$L_{overall}' = \Sigma_{i=1}^{m}((1-w_i)(\lambda_L L_{Li} + \lambda_F L_{Fi}) + \lambda_S L_{Si}) \tag{13}$$

In the training process, the second model may be iteratively trained with an object that the comprehensive loss function $L_{overall}$ or $T_{overall}'$ reaches a minimum value. The training process may end when the comprehensive loss function reaches the minimum value, or when a value of the comprehensive loss function no longer changes, thereby obtaining the second model to which the knowledge is effectively transferred. Those skilled in the art should understand that, the second model may be trained, based on the constructed comprehensive loss function, by any existing method such as a gradient descent method, to obtain optimal parameters of the second model, which are not described in detail herein.

An exemplary manner of constructing the comprehensive loss function has been described, for example, using the loss function based on the cosine distance, the loss function based on the Euclidean distance, or the Softmax loss function by example. However, it should be noted that based on the present disclosure, those skilled in the art may construct the first loss function or the second loss function, or the first sub-loss function or the second sub-loss function in any appropriate manner to obtain the comprehensive loss function, as long as each of the first loss function, the second loss function, the first sub-loss function and the second sub-loss function meets the corresponding definition in the present disclosure.

The method of knowledge transferring according to the embodiment of the present disclosure is described above with reference to FIG. 1. With the method of knowledge transferring, it is advantageous in avoiding transferring incorrect knowledge of the "teacher" model to the "student" model, such that the knowledge transferring can be achieved more effectively and accurately.

Figure 3:
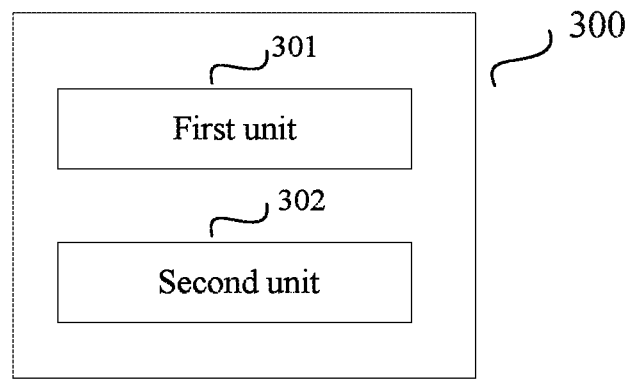
FIG. 3 is a schematic structural block diagram of a knowledge transferring device according to an embodiment of the present disclosure.

In an embodiment of the present disclosure, a knowledge transferring device is provided. FIG. 3 is a schematic structural block diagram of a knowledge transferring device according to an embodiment of the present disclosure.

As shown in FIG. 3, a knowledge transferring device 300 may include a first unit 301 and a second unit 302. The first unit 301 is configured to obtain a first model which has been trained in advance with respect to a predetermined task. The second unit 302 is configured to train a second model with respect to the predetermined task by utilizing a comprehensive loss function, such that the second model has knowledge of the first model. The comprehensive loss function used by the second unit 302 may be based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task.

The knowledge transferring device and the units in the knowledge transferring device may perform, for example, operations and/or processes of the method of knowledge transferring described with reference to FIG. 1, and operations and/or processes in steps of said method of knowledge transferring, and may achieve technical effects similar to those of the method of knowledge transferring, which are not repeated herein.

The second model which is obtained after the knowledge transferring by the method of knowledge transferring in the knowledge transferring device as described in embodiments described herein acquires a processing capacity of the first model, and thus it can be used to process data.

In an embodiment of the present disclosure, an information processing apparatus is provided. The information processing apparatus includes a processor. The processor is configured to: input data for process into the second model which is obtained by the method of knowledge transferring described above; and obtain a processing result of the second model for the data for process.

As an example, the second model (as well as the first model on which the second model is based) used in the information processing apparatus may be a neural network model, such as a convolutional neural network (CNN) model. As an example, the data for process may include one of image data, speech data, or document data. For example, the data for process may be human face data.

As an example, the first model may be a neural network model having a complex structure and a number of parameters, and the second model may be a neural network model smaller than the first model, for example, including fewer layers and fewer parameters than the first model. In this case, the processing speed of the second model obtained after the knowledge transferring can be faster than that of the first model. Therefore, the processing efficiency can be increased with the information processing apparatus performing process using the second model.

Similar to the description of the method of knowledge transferring described above, the "processing result" of the second model for the data for process may include a final output result of the second model for the data for process in regard to the predetermined task, such as a classification result of the classification task. That is, the information processing apparatus may directly use the second model to perform the recognition task, and the output result of the second model is used as the classification result.

In a preferred embodiment, for the comprehensive loss function constructed in the method of knowledge transferring for obtaining the second model, as the accuracy of the output result of the first model for the training sample in regard to the predetermined task is higher, the first loss function in the comprehensive loss function that is weighted based on said accuracy will have a greater weight. Therefore, with the second model obtained by the method of knowledge transferring, the incorrect knowledge of the first model can be prevented from being transferred to the second model, thereby improving the processing accuracy of the information processing apparatus.

Further, similar to the description of the method of knowledge transferring described above, the "processing result" may also include a feature extracted from the data for process by the second model. For example, in the case that the second model is a neural network model, the processing result may include output data of a certain layer of the neural network model after the data for process is input into the neural network model.

Since the second model which is obtained by the method of knowledge transferring acquires the processing capacity of the first model, such as a capacity of the first model to characterizing a feature of a sample, the second model may be used as a feature extractor for extracting the predetermined feature of the sample.

In a preferred embodiment, for the comprehensive loss function that is constructed in the method of knowledge transferring for obtaining the second model, the first loss function related to the knowledge transferring that is included in the comprehensive loss function may include a first sub-loss function. The first sub-loss function represents a difference between a predetermined feature extracted from the training sample by the second model and a predetermined feature extracted from the training sample by the first model. Further, the first loss function may optionally include a second sub-loss function. The second sub-loss function represents a difference between output results of the second model and the first model for the training sample in regard to the predetermined task.

The first sub-loss function representing the feature difference is particularly useful when the second model is obtained to be used as a feature extractor. When the first loss function in the comprehensive loss function is constructed based on such a sub-loss function, the second model obtained after the knowledge transferring acquires a capacity of the first model to characterize features of the data. Therefore, the information processing apparatus may use the second model in feature extraction.

In a preferred embodiment, the predetermined task of the second model may include a classification task, and the first loss function included in the comprehensive loss function which is constructed in the method of knowledge transferring may be based on a cosine distance between the predetermined feature extracted from the training sample by the second model and the predetermined feature extracted from the training sample by the first model.

For example, the first loss function may include the first sub-loss function based on the cosine distance described in the above formula (4) and optionally the second sub-loss function, and it can be expressed as the above formula (7). Alternatively, the first loss function in this preferred embodiment may include only the first sub-loss function, without the second sub-loss function. For example, the first loss function may be expressed as an expression in which an item of $\lambda_L L_{Li}$ in the formula (8) is removed.

In this preferred embodiment, the processor may be configured to extract a predetermined feature from the data for process by the second model, as the processing result for the data for process. The processor may further be configured to calculate a cosine similarity between the predetermined feature extracted from the data for process and a predetermined feature extracted from target data by the second model, to determine a similarity between the data for process and the target data based on the cosine similarity, for example, so as to determine whether the data for process matches the target data. Optionally, the processor may further be configured to determine whether the data for process is the target data based on, for example, a comparison result between the calculated cosine similarity and a predetermined similarity threshold, so as to complete the recognition processing.

Preferably, the predetermined feature that is extracted from the data for process or the target data by the second model in calculating the similarity corresponds to the predetermined feature that is extracted from the training sample by the second model in constructing the first loss function included in the comprehensive loss function in the method of knowledge transferring. For example, the above features are extracted from a same layer of the second model which is a neural network model.

As previously discussed with reference to FIG. 2, the second model which is obtained after the knowledge transferring with the loss function based on the cosine distance is especially suitable for tasks involving similarity comparison, such as tasks of face recognition, speaker recognition, and fingerprint recognition. The inventor performs an experiment involving comparative models. For each model involved in the experiment, face image recognition is performed with respect to a public dataset of labelled faces in wild (LFW), wherein a cosine similarity is calculated between a feature extracted by the model from an face image to be processed in the LFW and a feature extracted by the model from a target face image, so as to determine whether the face image to be processed matches the target face image. In the experiment, when the features are extracted by a first model which is obtained in advance, the recognition accuracy is 97.73±0.62%. When the features are extracted by a second model which is trained by utilizing a first loss function including a first sub-loss function based on a Euclidean distance, the recognition accuracy is 96.90%±0.97%. When the features are extracted by a second model which is trained by utilizing a first loss function including a first sub-loss function based on a cosine distance as described in this preferred embodiment, the recognition accuracy is 97.85±0.60%, thus proving that the loss function which is based on the cosine distance between features in this preferred embodiment is effective for recognition tasks.

Operations implemented by the information processing apparatus according the embodiment of the present disclosure have been described above. With this information processing apparatus, the data may be processed by the second model having the "correct" knowledge of the first model and having a processing speed faster than that of the first model. Further, in a preferred embodiment, the second model having a feature extraction capacity that is suitable for the recognition processing may be used as a feature extractor to perform recognition processing.

Figure 4:
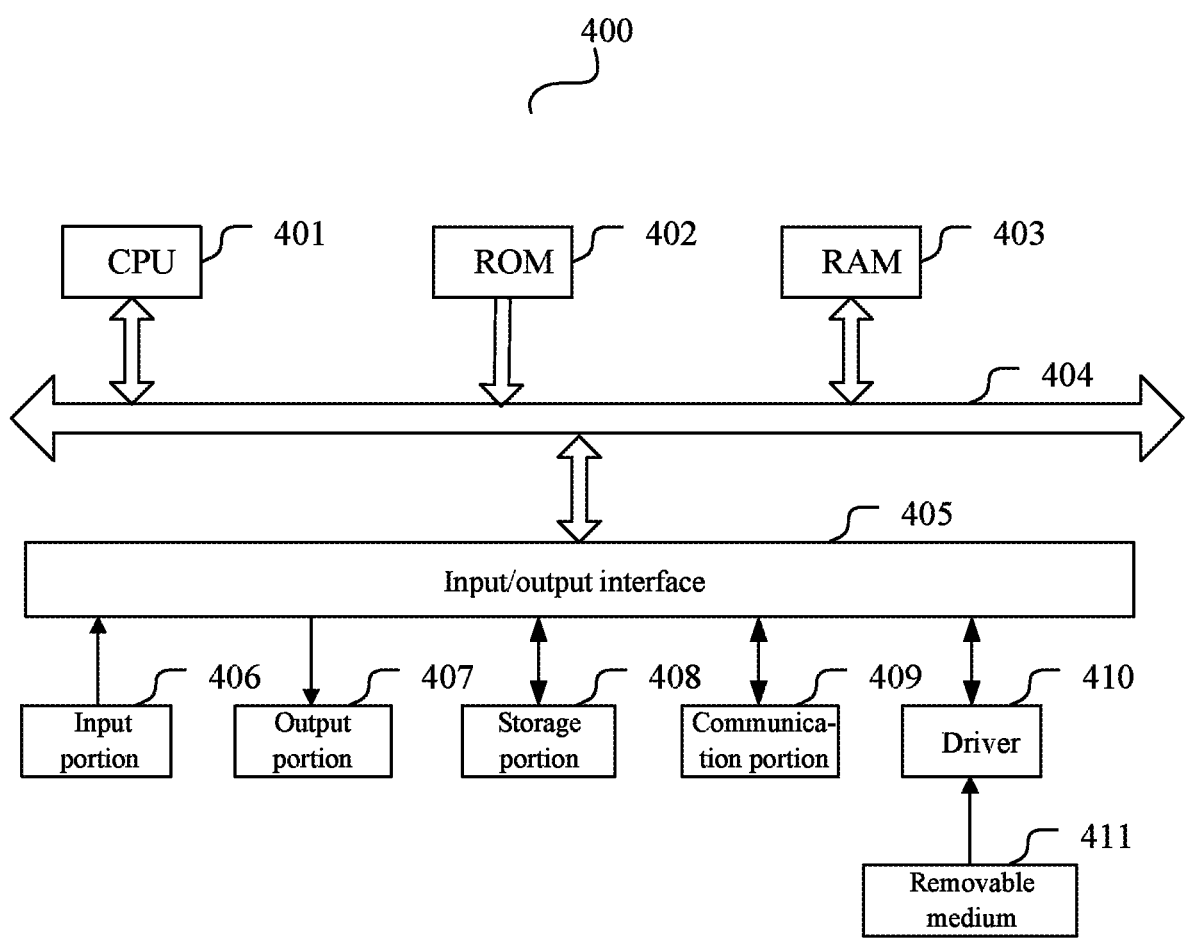
FIG. 4 is a schematic structural diagram showing an exemplary hardware configuration for implementing the method of knowledge transferring, the knowledge transferring device and the information processing apparatus according to embodiments of the present disclosure.

FIG. 4 is a schematic structural diagram showing an exemplary hardware configuration 400 that is capable of implementing the method of knowledge transferring, the knowledge transferring device and the information processing apparatus according to the embodiments of the present disclosure.

In FIG. 4, a central processing unit (CPU) 401 performs various types of processing according to programs stored in a read only memory (ROM) 402 or programs loaded from a storage portion 408 to a random access memory (RAM) 403. Data required when the CPU 401 performs various types of processing is stored in the RAM 403 as needed. The CPU 401, the ROM 402, and the RAM 403 are connected to each other via a bus 404. An input/output interface 405 is also connected to the bus 404.

The following components are connected to the input/output interface 405: an input portion 406 (including a keyboard, a mouse or the like), an output portion 407 (including a display such as a cathode ray tube (CRT), a liquid crystal display (LCD), a speaker or the like), the storage portion 408 (including a hard disk or the like), and a communication portion 409 (including a network interface card such as a LAN card, a modem or the like). The communication portion 409 performs communication processing via a network such as the Internet. A driver 410 may also be connected to the input/output interface 405 as needed. A removable medium 411 such as a magnetic disk, an optical disk, a magneto-optical disk and a semiconductor memory may be installed on the driver 410 as needed, such that computer programs read from the removable medium 411 are installed in the storage portion 408 as needed.

A program product having stored thereon machine readable instruction code is further provided in the present disclosure. The instruction code, when read and executed by a machine, is capable of implementing the method of knowledge transferring according to the embodiment of the present disclosure. Accordingly, a storage medium for carrying the program product, such as a magnetic disk, an optical disk, a magneto-optical disk or a semiconductor memory, is also included in the present disclosure.

That is, a storage medium having stored thereon machine readable instruction code is further provided in the present disclosure. The instruction code, when read and executed by a machine, is capable of causing the machine to implement a method of knowledge transferring. The instruction code includes an instruction code portion for: obtaining a first model which has been trained in advance with respect to a predetermined task; and training a second model with respect to the predetermined task by utilizing a comprehensive loss function, such that the second model has knowledge of the first model. The comprehensive loss function is based on a first loss function weighted by accuracy of an output result of the first model for a training sample in regard to the predetermined task, and a second loss function. The first loss function represents a difference between processing results of the second model and the first model for the training sample. The second loss function represents accuracy of an output result of the second model for the training sample in regard to the predetermined task.

The storage medium may include but not limited to, a magnetic disk, an optical disk, a magneto-optical disk, a semiconductor memory or the like.

In the above description of specific embodiments of the present disclosure, the features described and/or illustrated with respect to one embodiment may be used in one or more other embodiments in the same or similar manner, may be combined with features in other embodiments, or may replace features in other embodiments.

Further, the method described in embodiments of the present disclosure is not limited to be performed in a chronological order described in the specification or shown in the drawings, but may also be performed in other chronological order, in parallel or independently. Therefore, the order for executing the method described in the specification does not limit the technical scope of the present disclosure.

Further, it is apparent that various operation procedures of the method according to the embodiments of the present disclosure may be implemented by computer executable programs stored in various machine readable storage mediums.

Further, the object of the present disclosure can also be achieved in the following manner. A storage medium on which the above executable program codes are stored is provided to a system or device directly or indirectly. A computer or a central processing unit (CPU) in the system or in the device reads and executes the above program codes.

In this case, as long as the system or the device has a function of executing a program, the embodiments of the present disclosure are not limited to the program, and the program may be in any form such as a target program, a program executed by an interpreter or a script program provided to the operating system.

The above machine readable storage mediums include but are not limited to, various memories and storage units, semiconductor devices, disk units such as an optical disk, a magnetic disk, a magneto-optical disk, and other mediums suitable for storing information.

Further, an information processing terminal as a client device may also implement the embodiments of the present disclosure by connecting to a corresponding website on the Internet, downloading and installing the computer program codes in the present disclosure to the information processing terminal and executing the program codes.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on a non-transitory computer-readable media. Examples of the computer-readable recording media include a magnetic recording apparatus, an optical disk, a magneto-optical disk, and/or a semiconductor memory (for example, RAM, ROM, etc.), etc.

In summary, with respect to embodiments of the present disclosure, the present disclosure provides the following solutions but is not limited thereto.

Solution 1. A method of knowledge transferring, including:

obtaining a first model which has been trained in advance with respect to a predetermined task; and training a second model with respect to the predetermined task by utilizing a comprehensive loss function, such that the second model has knowledge of the first model, wherein the comprehensive loss function is based on a first loss function weighted by accuracy of an output result of the first model for a training sample in regard to the predetermined task, and a second loss function, wherein the first loss function represents a difference between processing results of the second model and the first model for the training sample, and the second loss function represents accuracy of an output result of the second model for the training sample in regard to the predetermined task.

Solution 2. The method of knowledge transferring according to Solution 1, wherein the first loss function includes a first sub-loss function representing a difference between a predetermined feature extracted from the training sample by the second model and a predetermined feature extracted from the training sample by the first model.

Solution 3. The method of knowledge transferring according to Solution 2, wherein the first loss function further includes a second sub-loss function representing a difference between output results of the second model and the first model for the training sample in regard to the predetermined task.

Solution 4. The method of knowledge transferring according to Solution 2, wherein the training sample includes one of an image sample, a speech sample, or a document sample.

Solution 5. The method of knowledge transferring according to Solution 2, wherein when the accuracy of the output result of the first model for the training sample in regard to the predetermined task is higher, a weight of the first loss function is greater.

Solution 6. The method of knowledge transferring according to any one of Solutions 2 to 5, wherein the predetermined task includes a classification task.

Solution 7. The method of knowledge transferring according to Solution 6, wherein the first sub-loss function is based on a cosine distance between the predetermined feature extracted from the training sample by the second model and the predetermined feature extracted from the training sample by the first model.

Solution 8. An information processing apparatus, including:

a processor configured to:

input data for process into the second model which is obtained by the method of knowledge transferring according to solution 1; and obtain a processing result of the second model for the data for process.

Solution 9. The information processing apparatus according to Solution 8, wherein the data for process includes one of image data, speech data, or document data.

Solution 10. The information processing apparatus according to Solution 8, wherein the first loss function includes a first sub-loss function representing a difference between a predetermined feature extracted from the training sample by the second model and a predetermined feature extracted from the training sample by the first model.

Solution 11. The information processing apparatus according to Solution 9, wherein the first loss function further includes a second sub-loss function representing a difference between output results of the second model and the first model for the training sample in regard to the predetermined task.

Solution 12. The information processing apparatus according to any one of Solutions 8 to 11, wherein when the accuracy of the output result of the first model for the training sample in regard to the predetermined task is higher, a weight of the first loss function is greater.

Solution 13. The information processing apparatus according to any one of Solutions 8 to 12, wherein the predetermined task includes a classification task, the first loss function is based on a cosine distance between a predetermined feature extracted from the training sample by the second model and a predetermined feature extracted from the training sample by the first model, and wherein the processor is configured to extract a predetermined feature from the data for process by the second model, as the processing result for the data for process, and is further configured to calculate a cosine similarity between the predetermined feature extracted from the data for process and a predetermined feature extracted from target data by the second model, to determine a similarity between the data for process and the target data based on the cosine similarity.

Solution 14. A storage medium having stored thereon machine readable instruction code that, when read and executed by a machine, is capable of causing the machine to implement a method of knowledge transferring, the instruction code including:

an instruction code portion for:

obtaining a first model which has been trained in advance with respect to a predetermined task; and training a second model with respect to the predetermined task by utilizing a comprehensive loss function, such that the second model has knowledge of the first model, wherein the comprehensive loss function is based on a first loss function weighted by accuracy of an output result of the first model for a training sample in regard to the predetermined task, and a second loss function, wherein the first loss function represents a difference between processing results of the second model and the first model for the training sample, and the second loss function represents accuracy of an output result of the second model for the training sample in regard to the predetermined task.

Solution 15. The storage medium according to Solution 14, wherein the first loss function includes a first sub-loss function representing a difference between a predetermined feature extracted from the training sample by the second model and a predetermined feature extracted from the training sample by the first model.

Solution 16. The storage medium according to Solution 15, wherein the first loss function further includes a second sub-loss function representing a difference between output results of the second model and the first model for the training sample in regard to the predetermined task.

Solution 17. The storage medium according to Solution 15, wherein the training sample includes one of an image sample, a speech sample, or a document sample.

Solution 18. The storage medium according to Solution 15, wherein when the accuracy of the output result of the first model for the training sample in regard to the predetermined task is higher, a weight of the first loss function is greater.

Solution 19. The storage medium according to any one of Solutions 15 to 18, wherein the predetermined task includes a classification task.

Solution 20. The storage medium according to Solution 19, wherein the first sub-loss function is based on a cosine distance between the predetermined feature extracted from the training sample by the second model and the predetermined feature extracted from the training sample by the first model.

Finally, it should further be noted that the relationship terminologies such as first, second or the like are only used herein to distinguish one entity or operation from another, rather than to necessitate or imply that the actual relationship or order exists between the entities or operations. Furthermore, the terms "including", "comprising" or any other variant thereof are intended to encompass non-exclusive inclusion, so that a process, a method, an article, or a device including a series of elements include not only those elements, but also include other elements that are not explicitly listed, or include elements that are inherent to such processes, methods, articles, or devices. In addition, in the absence of more restrictions, the elements defined by the sentence "including a . . . " do not exclude the presence of additional same elements in the process, method, article, or device that includes the elements.

Although the present disclosure have been described by the description of specific embodiments of the present disclosure above, it should be understood that, various changes, improvements or equivalents may be made by those skilled in the art on the present disclosure without departing from the spirit and scope of the appended claims. The changes, improvements or equivalents should be regarded as falling within the protection scope of the present disclosure.

What is claimed is:

1. A method of knowledge transferring, including:
obtaining a first model which has been trained in advance with respect to a predetermined task; and
training a second model with respect to the predetermined task by utilizing a comprehensive loss function, such that the second model has knowledge of the first model,
wherein the comprehensive loss function is based on a first loss function and a second loss function, the first loss function representing differences between respective processing results of the second model and the first model for a plurality of training samples, the differences being weighted by weights each of which is accuracy of an output result of the first model for a corresponding one in the plurality of training samples in regard to the predetermined task, and the second loss function representing accuracy of each output result of the second model for each one of the plurality of training samples in regard to the predetermined task, and
wherein, for each training sample of the plurality of training samples, when a training sample is correctly classified by the first model, accuracy of an output result of the first model for the training sample in regard to the predetermined task that is used as the weight in the first loss function reaches a maximum value.

2. The method of knowledge transferring according to claim 1, wherein the first loss function includes a first sub-loss function representing a difference between a predetermined feature extracted from one of the training samples by the second model and a predetermined feature extracted from the training sample by the first model, the first sub-loss function being weighted by the weight which is accuracy of the output result of the first model for the training sample in regard to the predetermined task.

3. The method of knowledge transferring according to claim 2, wherein the first loss function further includes a second sub-loss function representing a difference between output results of the second model and the first model for the training sample in regard to the predetermined task, the second sub-loss function being weighted by the weight which is accuracy of the output result of the first model for the training sample in regard to the predetermined task.

4. The method of knowledge transferring according to claim 2, wherein the training sample includes one of an image sample, a speech sample, or a document sample.

5. The method of knowledge transferring according to claim 2, wherein when the accuracy of the output result of the first model for the training sample in regard to the predetermined task is higher, the weight in the first loss function is greater.

6. The method of knowledge transferring according to claim 2, wherein the predetermined task includes a classification task.

7. The method of knowledge transferring according to claim 6, wherein the first sub-loss function is based on a cosine distance between the predetermined feature extracted from the training sample by the second model and the predetermined feature extracted from the training sample by the first model.

8. An information processing apparatus, comprising:
a processor configured to:
input data for process into the second model which is obtained by the method of knowledge transferring according to claim 1; and
obtain a processing result of the second model for the data for process.

9. The information processing apparatus according to claim 8, wherein the data for process includes one of image data, speech data, or document data.

10. The information processing apparatus according to claim 8, wherein the first loss function includes a first sub-loss function representing a difference between a predetermined feature extracted from one of the training samples by the second model and a predetermined feature extracted from the training sample by the first model, the first sub-loss function being weighted by the weight which is accuracy of the output result of the first model for the training sample in regard to the predetermined task.

11. The information processing apparatus according to claim 9, wherein the first loss function further includes a second sub-loss function representing a difference between output results of the second model and the first model for the training sample in regard to the predetermined task, the second sub-loss function being weighted by the weight which is accuracy of the output result of the first model for the training sample in regard to the predetermined task.

12. The information processing apparatus according to claim 8, wherein when the accuracy of the output result of the first model for the training sample in regard to the predetermined task is higher, the weight in the first loss function is greater.

13. The information processing apparatus according to claim 8, wherein the predetermined task includes a classification task, the first loss function is based on cosine distances between predetermined features extracted from the training samples by the second model and a predetermined features extracted from the training samples by the first model, and the processor is configured to extract a predetermined feature from the data for process by the second model, as the processing result for the data for process, and is further configured to calculate a cosine similarity between the predetermined feature extracted from the data for process and a predetermined feature extracted from target data by the second model, to determine a similarity between the data for process and the target data based on the cosine similarity.

14. A non-transitory storage medium having stored thereon machine readable instruction code that, when read and executed by a machine, causes the machine to implement a method of knowledge transferring, comprising:

obtaining a first model which has been trained in advance with respect to a predetermined task; and training a second model with respect to the predetermined task by utilizing a comprehensive loss function, such that the second model has knowledge of the first model, wherein the comprehensive loss function is based on a first loss function and a second loss function, the first loss function representing differences between respective processing results of the second model and the first model for a plurality of training samples, the differences being weighted by weights each of which is accuracy of an output result of the first model for a corresponding one in the plurality of training samples in regard to the predetermined task, and the second loss function representing accuracy of each output result of the second model for each one of the plurality of training samples in regard to the predetermined task, and wherein, for each training sample of the plurality of training samples, when a training sample is correctly classified by the first model, accuracy of an output result of the first model for the training sample in regard to the predetermined task that is used as the weight in the first loss function reaches a maximum value.

15. The non-transitory storage medium according to claim 14, wherein the first loss function includes a first sub-loss function representing a difference between a predetermined feature extracted from one of the training samples by the second model and a predetermined feature extracted from the training sample by the first model, the first sub-loss function being weighted by the weight which is accuracy of the output result of the first model for the training sample in regard to the predetermined task.

16. The non-transitory storage medium according to claim 15, wherein the first loss function further includes a second sub-loss function representing a difference between output results of the second model and the first model for the training sample in regard to the predetermined task, the second sub-loss function being weighted by the weight which is accuracy of the output result of the first model for the training sample in regard to the predetermined task.

17. The non-transitory storage medium according to claim 15, wherein the training sample includes one of an image sample, a speech sample, or a document sample.

18. The non-transitory storage medium according to claim 15, wherein when the accuracy of the output result of the first model for the training sample in regard to the predetermined task is higher, the weight in the first loss function is greater.

19. The non-transitory storage medium according to claim 15, wherein the predetermined task includes a classification task.

20. The non-transitory storage medium according to claim 19, wherein the first sub-loss function is based on a cosine distance between the predetermined feature extracted from the training sample by the second model and the predetermined feature extracted from the training sample by the first model.

* * * * *